July 26, 1938.    L. MACHTS ET AL    2,124,825
PROCESS AND APPARATUS FOR THE INDIRECT DETERMINATION
OF EARTH AND AIR-ELECTRICAL CONDITIONS
Filed Jan. 22, 1934    2 Sheets-Sheet 1
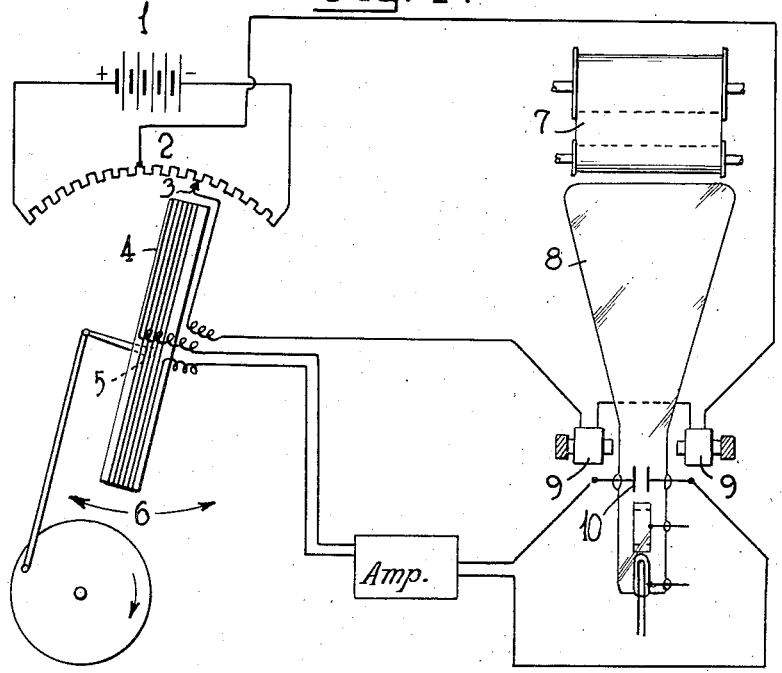
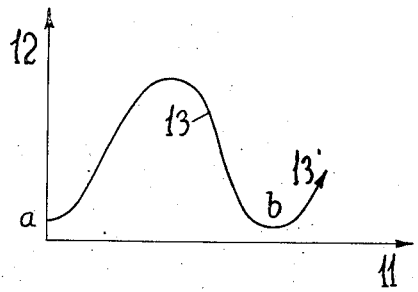
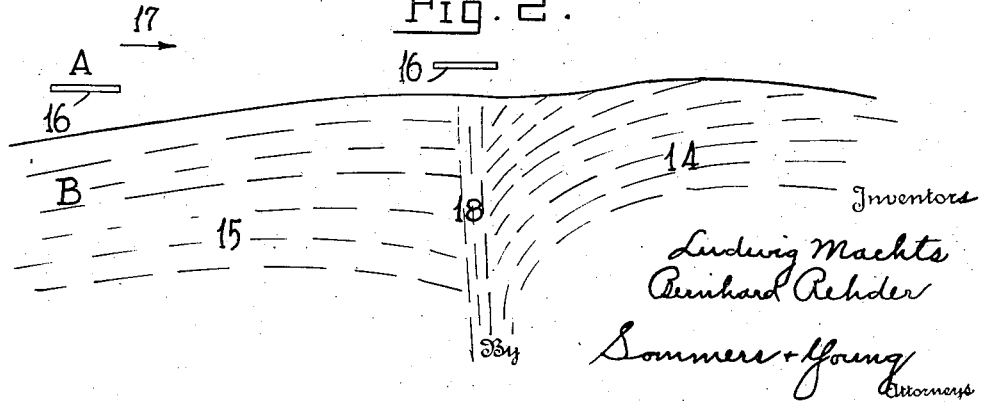

July 26, 1938.   L. MACHTS ET AL   2,124,825
PROCESS AND APPARATUS FOR THE INDIRECT DETERMINATION
OF EARTH AND AIR-ELECTRICAL CONDITIONS
Filed Jan. 22, 1934   2 Sheets-Sheet 2
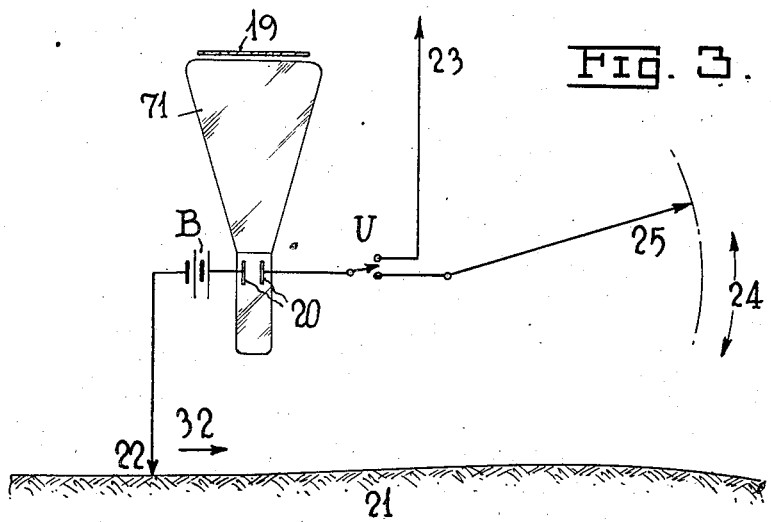
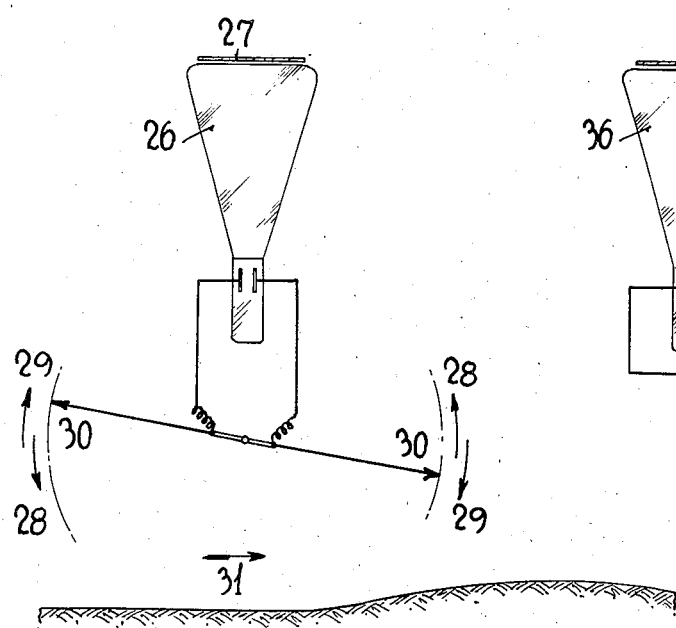
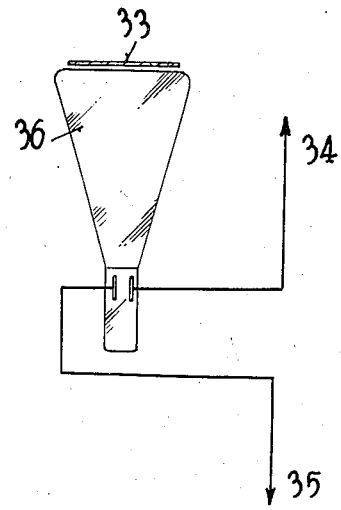

Patented July 26, 1938

2,124,825

UNITED STATES PATENT OFFICE 2,124,825

PROCESS AND APPARATUS FOR THE INDIRECT DETERMINATION OF EARTH AND AIR-ELECTRICAL CONDITIONS

Ludwig Machts and Bernhard Rehder, Marburg-on-the-Lahn, Germany

Application January 22, 1934, Serial No. 707,794
In Germany December 10, 1932

11 Claims. (Cl. 175—182)

This invention relates to methods and apparatus for investigating the nature of electrical and magnetic field conditions existing in any given area. The invention relates specifically to methods and apparatus for obtaining a continuous indication of such conditions while the investigation is being conducted whereby irregularities of electrical and magnetic fields occurring in the surveyed area may be easily located and the factors causing such irregularities readily determined.

Determination of the location and nature of irregularities in electrical and magnetic field conditions existing in certain areas has proven to be valuable for locating the cause of said irregularities and is, therefore, useful for locating changes in the composition of earth strata, rock fractures, oil and water bearing earths, and general subsurface prospecting. The determination of the existence of such irregularities is likewise useful in the study of air conditions for finding the best location for lightning arrestors, buildings, laboratories, biological experimentation, radio installations, and similar apparatus or enterprises affected by electrical conditions in the earth and atmosphere.

It is known in the art how to measure the intensity and the direction of electrical and magnetic lines of force existing at a given point in space. It has also been found in the art of geophysical research that subsurface conditions could be investigated by a series of relatively complicated electrical measurements and computations. In contradistinction to the known involved methods of electrical research, the present invention provides relatively simple and accurate methods and apparatus for exploring the electrical conditions existing in a given area and permits the rapid location of points in said area at which irregularities in said conditions occur.

It is, therefore, the object of this invention to provide methods and apparatus for easily and quickly determining the location of points or areas subject to electrical and/or magnetic field conditions different from the conditions existing at adjacent points or in adjoining areas.

It is the object of this invention to provide methods and apparatus for determining easily and rapidly the directions and relative intensities of electrical and magnetic lines of force at various points in an investigation area.

It is also the object of this invention to provide methods and apparatus for making a continuous record of the electrical conditions existing in various parts of a survey area while the survey is being conducted.

It is also the object of this invention to provide methods and apparatus for conducting geophysical research for the determination of the location and extent of specific earth strata.

It is also the object of this invention to provide an economical and portable apparatus for use in the practice of the herein described methods of investigating electrical fields.

Other objects and advantages of this invention will be apparent from the following detailed description of devices suitable for practicing the method described, the scope of this invention being defined in the appended claims. For examples of suitable apparatus, reference is made to the accompanying drawings wherein:

Figure 1 is a diagrammatic view of a preferred form of apparatus.

Figure 1a is a typical example of the form of signal obtained by the use of the apparatus of Figure 1.

Figure 2 is a diagrammatic view of preferred method of investigating subsurface conditions by movement of the apparatus antenna in a horizontal plane.

Figure 3 is a diagrammatic view of a modified form of apparatus.

Figures 4 and 5 are diagrammatic views of arrangements of the apparatus for investigation of the direction as well as the intensity of the lines of force of electrical fields.

Referring to Fig. 1 of the drawings, a loop antenna is indicated by the numeral 4 and may be provided with an axis 5 about which the antenna can be swung as indicated by the double arrow 6. The antenna 4 is connected to an amplifier of conventional construction for suitable amplification of the currents induced in said antenna. The output of the amplifier is connected to the deviation plates 10 of a Braun tube 8. The anode, cathode, and filament of the Braun tube are connected to a suitable source of energy, not shown, for operation of the tube in the known manner. A potentiometer 2 is associated with said antenna 4 so that the potentiometer contact arm 3 moves with the loop antenna as the latter is rotated or oscillated on axis 5. A source of energy such as a battery 1 is connected to the potentiometer 2 which is, in turn, connected to suitable electro-magnets 9 associated with said Braun tube 8. A sensitized film 7 may be arranged adjacent the indicating screen at the wide end of the Braun tube for making a record of the deviations of the stream of cathode rays which impinge upon said screen. The film strip 7 may be drawn past the tube screen by suitable clock controlled mechanism, etc., which is not part of this invention and, therefore, not shown.

The signal produced by the Braun tube 8 may be recorded on the moving film 7 in the form of the oscillogram shown in Figure 1a. The cathode ray stream of the Braun tube is deflected up and down alternately in accordance with the intensity of the electrical field traversed by the apparatus antenna, the amplitude of the curve 13 being proportional to the intensity of the field traversed. The curve 13 itself, in general, follows the larger curve designated 13' due to the ray deviation produced by the electro-magnets 9 energized alternately as the antenna itself is rotated and the potentiometer arm 3 controlled thereby.

The use of the apparatus shown in Figure 1 for the investigation of subsurface strata is illustrated in Figure 2 where a horizontal loop antenna is indicated by the numeral 16. As the antenna 16 is moved horizontally over the earth 15 in the direction indicated by the arrow 17, a record is obtained representing a fairly constant electrical and magnetic field of the earth itself and other continuous artificial fields. As the antenna approaches the vertical earth strata 18 of different character than the earth 15, the record obtained changes due to irregularities in the electrical field caused by strata 18. The record obtained shows a maximum of variation when the antenna is directly over the strata 18 and diminishes in amount of variation as the antenna is shifted further along over normal earth 14. Thus it will be seen from this example that the use of the above apparatus to obtain a signal of irregularities in electrical conditions may be used to definitely locate the center of the disturbance and factor causing the irregularity.

In the apparatus illustrated in Figure 3, an open antenna 23 and a movable ground connection 22 are used in place of the loop type antenna heretofore described. The antenna and ground are connected to the deviation plates 20 of the Braun tube 71, a battery B being connected in the ground circuit. Suitable circuits are provided for the cathode, anode, and filament of the Braun tube 71 as described in connection with Figure 1. The antenna 23 may be arranged to be movable in a vertical plane in the direction of the arrow 24 or an additional movable antenna 25 connected in the tube circuit by a switch U may be provided.

In the apparatus shown diagrammatically in Figure 4, the deviation plates of the Braun tube 26 are connected respectively to a pair of antenna electrodes 30. The electrodes 30 are arranged end to end in a straight line, the electrodes being adapted to be oscillated in a vertical plane as indicated by the direction arrows 28 and 29. Arrow 31 indicates the direction in which apparatus is moved over the ground during the investigation. A recording element 27 may be associated with the Braun tube 26, which latter is also provided with the conventional operating devices.

The apparatus shown in Figure 5 is similar to that of Figure 4 except that the antenna electrodes 34 and 35 are arranged in a line perpendicular to the earth's surface. The Braun tube 36 may be provided with a recording element 33 and the usual operating devices previously described.

In the event that it is desired to obtain an audible signal indicative of the character of various portions of the area investigated, it is possible to connect a loud speaker or the like to the amplified induced currents. The character of the amplifying apparatus should be such that its output will produce a hum in the speaker, the pitch of the hum being proportional to the strength of the currents induced in the apparatus antenna. The audible signal may be used in place of the visual signal produced by the Braun tube where it is not necessary to keep a record of the character of electrical conditions in the areas investigated.

In the preferred method of practicing this invention, use is made of the normally existing electrical and/or magnetic fields in the area under investigation. The invention may also be practiced by utilizing an auxiliary electrical field in combination with the normally existing fields. In this latter method, apparatus is provided to generate and emit an auxiliary frequency of suitable character in the area being explored. The exploration apparatus is then responsive to the action of the combined electrical fields. The use of the auxiliary field permits more accurate exploration data to be obtained especially in areas having relatively weak electrical and magnetic fields under normal conditions. The apparatus for generating and emitting such auxiliary frequency or frequencies may be of conventional construction and does not form a part of the instant invention except as defined in the appended claims.

The operation of the devices shown and described is, in general, as follows. The Braun tube is properly energized so as to produce a stream of cathode rays directed against the observation screen on the end of the tube in a conventional manner. The apparatus antenna of either the loop or open type, depending on the form of apparatus employed, is then continuously moved about in the area whose electrical conditions are to be explored. As the antenna is moved, currents are set up in the antenna and connecting circuit proportional to the intensity of the field traversed by the antenna. These currents are amplified, if necessary, in conventional amplification devices and then applied to the deviation electrodes of the Braun tube. The currents produce a potential difference between the deviation electrodes and thereby cause the stream of cathode rays within the tube to be deflected. The amount of deflection may be observed as a signal on the observation screen of the Braun tube and are indicative of the intensity of the electrical fields traversed by the antenna.

To assist in the determination of the direction of the lines of force traversed by the antenna during the exploring process, the antenna may be oscillated about a vertical or horizontal axis either mechanically or manually at any suitable rate. When an antenna is approximately parallel to the lines of force traversed, the currents induced therein are less than when the antenna is perpendicular to the lines of force. Thus, by observing the signals which are indicative of the induced current intensity and at the same time noting the position of the antenna, it is possible to determine the direction of the electrical lines of force, the direction being perpendicular to the antenna when the signal produced is a maximum.

From the above description of the method and apparatus constituting practical embodiments of this invention, it will be apparent, that accurate data may be obtained regarding the relative nature of the electrical and magnetic conditions existing in various portions of a given area. By the use of an extremely simple and readily portable apparatus, it is possible to obtain very useful information regarding the location of various factors causing irregularities or variations in electrical conditions. The electrical fields are explored for the direction and intensity of the field at various places and, from such data, a wide variety of determinations are possible. It is thus readily possible to determine localities particularly subject to lightning discharges, localities of certain earth strata, and similar factors heretofore enumerated.

It is to be understood that many obvious variations may be made in the construction of the described apparatus and in method of using the same without departing from the scope of this invention as defined in the following claims.

We claim:—

1. The method of investigating irregularities existing below the surface of the ground within a given area, comprising: conveying a portion of an electric circuit continuously in and about said area, moving said circuit through repeated similar local motions in such manner as would produce induced current of rhythmic maxima and minima in an area of uniform electrical and magnetical properties while it is being conveyed in and about said area, for inducing currents in said circuit proportional to the intensity of a field existing in said area and to the actual position of the said circuit with respect to the plane of the said field, and indicating whether the maxima of reception due to certain positions of the said circuit are rhythmically followed by corresponding minima, for determining the location of factors causing variations in the sequence of maxima and minima.

2. The method of investigating the electrical and magnetic field conditions existing in a given area and the factors causing irregularities of said conditions, comprising, transporting a portion of an electrical circuit continuously over said area moving a portion of said circuit through repeated similar local motions in such a manner as would produce rhythmic maxima and minima in an area having uniform electrical and magnetic conditions to induce currents therein proportional to the intensity of the electrical and magnetic field traversed, obtaining signals from said induced currents indicative of the intensity of said currents, continuously recording said signals for forming a comparative record of the character of the conditions existing in various portions of said area of investigation and indicating whether the maxima of reception due to certain positions of the said circuit are rhythmically followed by corresponding minima, and determining the location of factors causing variations from the normal sequence of maxima and minima.

3. In apparatus for exploring the electrical and magnetic field conditions existing in a given area and the factors causing irregularities of said conditions, the combination comprising, a portable antenna adapted to be continuously moved about in said area, means for continuously moving said antenna through repeated similar local movements, to induce rhythmic variations of electric current therein a Braun tube connected with said antenna, a source of energy for operating said tube and means for continuously indicating and recording variations in the Braun tube caused by variation in the current induced in said antenna as the antenna is conveyed about in said area, 4. In apparatus for exploring the electrical and magnetic field conditions existing in a given area and the factors causing irregularities of said conditions, the combination comprising, a portable antenna adapted to be moved about in said area, means for inducing currents in said circuit having uniformity of rhythm of maxima and minima in an area of uniform character, and variations of said rhythm in a non-uniform area, a current amplifier connected with said antenna, a Braun tube connected with the output of said amplifier, a source of energy for operating said tube and means for continuously indicating and recording variations in rhythm of the current in the Braun tube caused by variation in the current in said circuit caused by non-uniformity of the field of the area explored as the antenna is conveyed about in said area.

5. In apparatus for exploring the electrical and magnetic field conditions existing in a given area and the factors causing irregularities of said conditions, the combination comprising, a portable antenna adapted to be moved about in said area, a potentiometer associated with said antenna whereby the potentiometer setting is varied by rotary movement of said antenna, a source of energy connected across said potentiometer, a Braun tube connected with said antenna, a source of energy for operating said tube, and means associated with said tube operated by said first mentioned source of energy and controlled by said potentiometer for deflecting the path of rays emitted by said tube in accordance with the relative position of said antenna.

6. In apparatus for exploring the electrical and magnetic field conditions existing in a given area and the factors causing irregularities of said conditions, the combination comprising, a portable antenna adapted to be moved about in said area to various points thereof, means for imparting to said antenna repeated similar local movements such as would produce rhythmic occurrences of maxima and minima inductional effects in a uniform field, a Braun tube connected with said antenna, a source of energy for operating said tube, and a sensitized recording film adjacent the screen end of said Braun tube for producing a continuous record of the rhythmic and non-rhythmic deflection of the stream of cathode rays emitted within said tube, said deflections being due to transport and local movement of said antenna through electric and magnetic fields of non-uniform intensities.

7. The method of exploring the electrical and magnetic field conditions existing in a given area and the factors causing variations in said conditions, comprising, generating and emitting a uniform auxiliary electrical field in said area, conveying a portion of an electrical circuit continuously about in said area imparting to said portion repeated similar local movements such as would induce therein currents of rhythmically occurring maxima and minima and proportional to the intensity of the combined generated and normally existing electrical and magnetic fields traversed, obtaining signals from said induced currents indicative of the intensity of said currents, comparing the signals obtained in various portions of said area with the signals obtained in other portions of said area of investigation, indicating whether the maxima of reception due to certain positions of said circuit are rhythmically followed by corresponding minima for determining the location of the factors causing variations in the rhythm of the sequence of maxima and minima.

8. The method of exploring the electrical and magnetic field conditions existing in a given area and the factors causing variations in said conditions, comprising, generating and emitting a rhythmically varying high frequency electrical field throughout said area to be investigated, conveying a portion of an electrical circuit continuously about in said area imparting to said portion repeated similar local movements such as would induce therein currents of rhythmically occurring maxima and minima to induce currents therein proportional to the intensity of the combined generated and normally existing electrical and magnetic fields traversed, obtaining signals from said induced currents indicative of the intensity of said currents, continuously recording said signals for forming a comparative record of the character of the conditions existing in various portions of said area of investigation and indicating whether the maxima of reception due to certain positions of said circuit are rhythmically followed by corresponding minima for determining the location of the factors causing variations in the rhythm of the sequence of maxima and minima.

9. In apparatus for exploring the electrical and magnetic field conditions existing in a given area and the factors causing irregularities in said conditions, the combination comprising, means for generating and emitting an auxiliary field having rhythmically occurring maxima and minima in said area to be investigated, a portable antenna adapted to be moved about in said area, a Braun tube connected with said antenna whereby operation of the tube is controlled by the action of the combined natural and auxiliary field conditions on said antenna, and a source of energy for operating said tube and means for continuously indicating and recording variations in the rhythm of the maxima and minima occurring in said Braun tube, indicating non-uniformity of the conditions of the area through which the antenna is conveyed.

10. In apparatus for exploring the electrical and magnetic field conditions existing in a given area and the factors causing irregularities in said conditions, the combination comprising, means for generating and emitting a high frequency electrical field having rhythmically occurring maxima and minima in said area to be investigated, a portable antenna adapted to be moved about in said area, a Braun tube connected with said antenna, and a source of energy for operating said tube and means for continuously indicating and recording variations in the rhythm of the maxima and minima occurring in said Braun tube, indicating non-uniformity of the conditions of the area through which the antenna is conveyed.

11. In apparatus for exploring the electrical and magnetic field conditions existing in a given area and the factors causing irregularities in said conditions, the combination comprising, means for generating and emitting a rhythmically varying auxiliary field in said area to be investigated, a portable antenna adapted to be moved about in said area, a Braun tube connected with said antenna, a source of energy for operating said Braun tube, and recording means responsive to the variations in said tube for indicating variations in the rhythm of variation of the current induced in said antenna due to difference in the electrical and magnetic conditions of parts of the area through which the antenna is moved.

LUDWIG MACHTS.
BERNHARD REHDER.